United States Patent [19]

Bartha et al.

[11] 4,213,789
[45] Jul. 22, 1980

[54] GLASS FORMING COMPOUND AND BRICK MADE THEREWITH

[75] Inventors: Peter Bartha, Bovenden; Alexander Tutsek, Göttingen, both of Fed. Rep. of Germany

[73] Assignee: Refratechnik GmbH, Göttingen, Fed. Rep. of Germany

[21] Appl. No.: 910,751

[22] Filed: May 30, 1978

[30] Foreign Application Priority Data

Dec. 6, 1977 [DE] Fed. Rep. of Germany ....... 2754190

[51] Int. Cl.$^2$ .............................................. C03C 3/04
[52] U.S. Cl. ......................................... 106/52; 106/65
[58] Field of Search ........................................... 106/52

[56] References Cited

U.S. PATENT DOCUMENTS

| | | | |
|---|---|---|---|
| 1,964,629 | 6/1934 | Grimm et al | 106/52 |
| 2,359,789 | 10/1944 | Pincus | 106/52 |
| 3,236,662 | 2/1966 | MacDowell | 106/52 |
| 3,944,352 | 3/1976 | Morgan | 106/52 |

FOREIGN PATENT DOCUMENTS 576205 3/1946 United Kingdom .
1005469 12/1962 United Kingdom .

OTHER PUBLICATIONS

Robinson, P. et al., "Subsolids Relations in the System $SiO_2$–$Al_2O_3$–$P_2O_5$", JACS, vol. 47, No. 11, pp. 587–592.

*Primary Examiner*—O. R. Vertiz
*Assistant Examiner*—Mark Bell
*Attorney, Agent, or Firm*—Hill, Van Santen, Steadman, Chiara & Simpson

[57] ABSTRACT

A glass forming compound having in its melted glass phase the formula $Si_2AlO(PO_4)_3$ or $4 SiO_2 \cdot Al_2O_3 \cdot 3 P_2O_5$ is provided together with grain mixtures for producing refractory thermally insulating bricks adapted for use in the preheating zone of a rotary cement kiln operating in an atmosphere containing alkali chlorides, particularly KCl. The bricks develop a glass layer on the kiln exposed face thereof which resists penetration by alkalis, particularly KCl.

4 Claims, 1 Drawing Figure

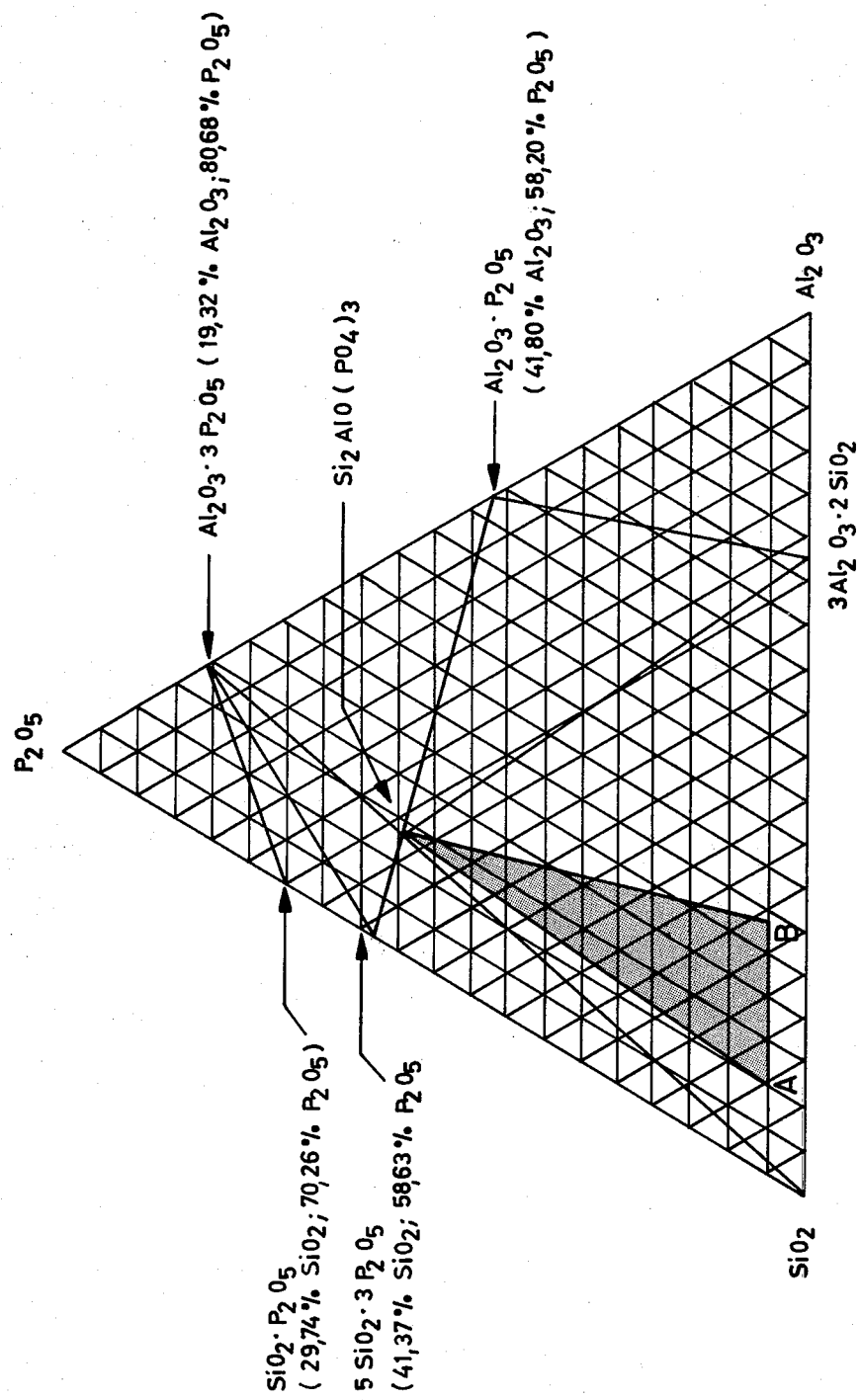

GLASS FORMING COMPOUND AND BRICK MADE THEREWITH

BACKGROUND OF THE INVENTION

This invention lies in the field of glass forming compositions having utility in thermally insulating bricks for rotary cement kilns and the like.

The refractory lining of the preheating zone of a rotary cement kiln, that is, the kiln region in which the raw material is dried and calcined, and, depending on whether the method employed involves a wet process, or a dry process, or the process employed utilizes grate or cyclone preheaters, which region constitutes about 25 to 45 percent of the entire length of a rotary kiln, is subject to characteristic stresses which may be described as follows: Since the raw material in this kiln region is in a stage of dehydration and calcination (endotherm processes), temperature stress is secondary as a wear or attrition factor. Mechanical stress as a result of abrasion is moderate, since the raw meal, or the preformed granules, are still soft. Chemical stress as a result of alkali oxides, alkali sulfates, alkali chlorides and alkali fluorides, which alkalis come from the raw material and from the fuel, and which alkalis accumulate in the kiln atmosphere because of the circulation of the kiln exhaust gases for better heat utilization, is, on the other hand, heavy to very heavy. These substances condense, particularly in the region of the preheating zone, on the surface of the refractory brick-lining and diffuse into the brick interior with more or less heavy chemical interaction with the brick components. This has the consequence that, with fireclaybricks of class A of German DIN-classification and corresponding light-weight refractory bricks, which are still used in this kiln region in part, alkali spalling occurs as a result of the formation of feldspar and feldspar-like compositions. A volume increase is associated therewith, and the alteration of the thermal coefficient of expansion associated therewith, in the sense of an increase therein, leads to bursting and rapid brick wear. In part, the open pores also fill up with alkali compounds, as a result of which chipping-off of brick hulls (i.e. outer surfaces) also results.

This realization has already led to the previously used fireclaybricks of class A ($Al_2O_3$ content between 30 and 45 percent by weight) being replaced either by fireclaybricks with a low $Al_2O_3$ content, or by siliceous light-weight refractory bricks with between 15 and 30 percent by weight of $Al_2O_3$. Bricks of this material group demonstrate an improved behavior by comparison to the previously employed fireclaybricks with regard to alkali attack and the compounds thereof, as the indicated reactions do not extend to the entire brick, but rather are characteristically limited only to the surface thereof. As a result of reaction of the alkalis with the brick components, solid protective glaze layers are formed, on the brick surface, which protective layers prevent, or, delay, a deeper in-diffusion of the alkalies into the brick and the above described bursting. This mechanism, in which a "heterogeneous" glaze formation thus takes place on the brick surface, which naturally can only occur if suitable substances are present from the kiln atmosphere which react with the brick material, made possible for the first time by the successful use of porous, thermally insulating bricks, for example, those of the kind described in British Pat. No. 1,005,469, in the preheating zone of rotary cement kilns.

It has shown itself to be the case, however, that the mechanism of superficial "brick sealing" as a consequence of the formation of solid protective layers by "heterogeneous" glaze formation fails to occur, particularly in the presence of KCl or other alkali chlorides, in the following designated simply by "KCl", in a kiln atmosphere. The KCl diffuses substantially completely into the open pores of the brick without reaction with the brick material. Because of the low melting temperature of KCl, and, in particular, the formation of eutectic melts with still lower melting points in the presence of $K_2SO_4$, the penetration of the KCl in the case of porous, thermally insulating bricks occurs so deeply that their insulating ability is lost, and the brick structure is destroyed by repeated cycles of solidification and melting, as well as the crystalization pressure of KCl.

In order to prevent infiltration of KCl into the porous, thermally insulating bricks, it is already known that the brick surface can be provided with heat-resistant or refractory protective coatings which contain an inorganic binding agent, such as, for example, water glass, aluminum sulfate, or monoaluminum sulfate. Protective coatings of this kind are, however, only effective for a short time, since they are rapidly worn away (removed) by the kiln feed sliding over them, and the surface of the brick is thus soon re-exposed. This exposed surface is now, in turn, fully exposed to the infiltration of KCl, or the like. In addition, in the case of alkali spalling, brick wear occurs by batch-wise occurrences of peeling-off or chipping-off of layers in a thickness of up to several centimeters, so that even protective coatings with theoretically good adhesion and high abrasion resistance are lost along with the chipped-off brick pieces. Renewing the protective coatings on the brick surfaces can, however, only be undertaken by repeated shutdowns of a rotary kiln, which is completely uneconomical.

BRIEF SUMMARY OF THE INVENTION

More particularly, the present invention concerns an improved glass-forming compound in the $Al_2O_3$—$SiO_2P_2O_5$ system, which is characterized by an $Al_2O_3$ content of about 14.00 percent by weight, and $SiO_2$ content of about 32.93 percent by weight, and a $P_2O_5$ content of about 53.02 percent by weight and which is further characterized by the formula when in a melted, homogeneous glass phase: $Si_2AlO(PO_4)_3$ or, alternatively the formula: $4SiO_2.Al_2O_3.3P_2O_5$. When melted at a temperature in a range of from about 1000° to 1300° C., this glass-forming compound of the three substance system $SiO_2$—$Al_2O_3$—$P_2O_5$ forms a highly-viscous melt which solidifies in a glass-like manner after cooling off.

A primary object of this invention is to provide a new and improved glass forming compound, or a glass forming composition which is especially suitable for use with refractory thermally insulating bricks of the type described above, and which guarantees a so-called "autogeneous" glaze formation, that is, one which is substantially independent of its ambient atmosphere, at the temperatures characteristically prevailing on brick surfaces in the preheating zone of rotary cement kilns.

Other and further objects, purposes, advantages, aims, utilities, features and the like will be apparent to those skilled in the art from a reading of the present specification taken together with the drawings.

BRIEF DESCRIPTION OF THE DRAWING

The accompanying FIGURE shows graphically a ternary diagram illustrating glass-forming compositions of the present invention and a glass derived therefrom.

DETAILED DESCRIPTION

The present invention provides a composition for producing a glass-forming compound of this invention which is characterized in that the individual components lie within a region defined by a plotted triangle having corners identified as A-B and C and having the following respective limiting compositions: A=10.5 percent by weight of $Al_2O_3$, 84.5 percent by weight of $SiO_2$, 5 percent by weight of $P_2O_5$; B=28.6 percent by weight of $Al_2O_3$, 66.4 percent by weight of $SiO_2$, 5 percent by weight of $P_2O_5$; and C=14.00 percent by weight of $Al_2O_3$, 32.93 percent by weight of $SiO_2$, 53.02 percent by weight of $P_2O_5$ (corresponding to $Si_2AlO(PO_4)_3$); see the accompanying FIGURE.

Also, an inventive grain mixture adapted for producing refractory thermally insulating bricks, such bricks being usable in the preheating zone of a rotary cement kiln having an atmosphere containing KCl, is provided. Such grain mixture is characterized by having a fines portion thereof consist of a grain size of not more than about 0.09 mm and which fines portion comprises at least about 10 percent by weight of such a grain mixture, on a 100 weight percent total grain mixture basis. Such fines portion is comprised of such a composition as above described.

The present invention provides a process for synthesizing such a glass-forming compound. Such process involves the step of heating the individual components in a starting composition to a temperature of from about 700° to 1100° C.

The present invention further provides an improved refractory thermally insulating brick comprising of the substance group $SiO_2$—$Al_2O_3$ and having an $Al_2O_3$ content which ranges from about 10 to 25 percent by weight on a 100 weight percent basis and which is particularly well adapted for use in the preheating zone of a rotary cement kiln operating with an atmosphere containing KCl. Such a brick is characterized by a capacity to develop a glaze layer covering at least those surface portions of such brick which face the kiln interior. Such a glaze layer is derived from, consists essentially of, the above-defined, glass-forming compound in a glass phase.

The glass-forming compound according to the invention, with the composition of 32.93 percent by weight of $SiO_2$, 14.00 percent by weight of $Al_2O_3$ and 53.02 percent by weight of $P_2O_5$ (on a 100 weight percent total weight basis) can of course be employed for the most varied applications, for example, for the production of cast glass bodies, but has particular utility in the refractory brick sector. Such a utility has the advantage that, besides the crystaline phase occurring in fireclaybricks such as mullite ($3Al_2O_3.2SiO_2$), cristobalite, or, tridymite, it occurs as an independent phase, and is thus compatible with these phases. This compatibility is one of the most important prerequisites for the mode of operation of this compound as an autogenous glaze-former for the material group $SiO_2$—$Al_2O_3$ in fireclaybricks.

The use of the glass-forming compound $Si_2AlO(PO_4)_3$ can be undertaken inventively in that the phase is presynthesized and then admixed, in specific quantity portions into a granulation mixture consisting of the main components $SiO_2$ and $Al_2O_3$ from the conventional refractory brick forming starting material group: clay, fireclay, and the like, in which regard the chemical composition of the bricks to be produced is to have less than about 25 percent by weight, and more than 10 percent by weight, of $Al_2O_3$. The rest of the brick chemical composition is comprised mainly of the second main brick component, $SiO_2$, together with the usual subordinate, minor impurities which refractory materials of this kind characteristically contain, such as $TiO_2Fe_2O_3$, CaO, MgO, and the like, such minor impurities as a class being somewhat variable in composition as those skilled in the art will appreciate, and such minor impurities comprising typically less than about 7 weight percent of a total starting refractory brick composition.

It is preferably also provided that, in a grain mixture to be used in brick manufacture, the relative quantities of $SiO_2$, $Al_2O_3$ and $P_2O_5$ in a reactive grain fraction thereof are adjusted to have a grain size of not greater than about 0.09 mm so that, when the brick is heated, the glaze-forming composition $Si_2AlO(PO_4)_3$ can be readily formed by a reaction of the three named components with one another. This occurs characteristically at temperatures of about 700° C. and above.

As starting materials for the formation of a glaze-forming compound of a brick composition, it is possible to use not only the pure oxides $SiO_2$, $Al_2$, $O_3$, and $P_2O_5$, but also other suitable $SiO_2$ and $Al_2O_3$ carriers, such as quartz, cristobalite, tridymite, kieselguhr, rice hull ash, fire clay, alumina, argillaceous earth, pure clay, or the like, as well as such materials as $H_3PO_4$, $Al(H_2PO_4)_3$, $(NH_4)_3PO_4$, or the like, as $P_2O_5$ carriers, such as are common in refractory brick technology.

The mode of operation of a superficial, autogeneously sealing, thermally insulating brick of this invention in the preheating zone of a rotary cement kiln, consists in the brick surface being exposed therein to a temperature at which the glaze-forming compound $Si_2AlO(PO_4)_3$ forms a highly-viscous melt. Since bricks in such a zone are exposed to a temperature gradient from the fireside to the shell side, the temperature decreases toward the kiln shell. As a result, only a hot brick surface which faces towards the kiln interior glazes (vitrifies), while the remaining part of the brick remains unglazed. When, now, as a result of, for example, wear, a decrease in the brick lining thickness comes about, on a glazed surface of an inventive brick so employed, as a result of chipping-off, or abrasion, of the superficial brick layer, then, in the rhythm of the brick attrition, the glazing is autogeneously continuously reformed again and again on such surface. By means of this process, a brick, which is gradually being worn away, is protected from an infiltration of alkalies, and in particular from an infiltration of KCl, into its open pores.

It follows from the explanations above that a thermally insulating brick of this invention, which is to be used in the above described mode of operation in the preheating zone of rotary cement kilns, must, during its production, be dried and/or fired below the melting point of the compound $Si_2AlO(PO_4)_3$. It is also advantageous to employ this type of thermally insulating brick in its unfired state, with the $P_2O_5$ necessary for the formation of $Si_2AlO(PO_4)_3$ being able to be introduced in the form of materials, such as $H_3PO_4$, $Al(H_2PO_4)_3$, or the like, which materials are simultaneously effective as chemical binders, where, by a reaction of the $P_2O_5$ carrier with the reactive portions of $SiO_2$ and $Al_2O_3$, $Si_2AlO(PO_4)_3$ can form from about 700° C. on up.

In a grain mixture of this invention adapted for the production of refractory bricks, the grain mixture average particle size can, for example, range from 0 to about 4 mm and only the fines portion thereof with a grain size of less than about 0.09 mm takes part in the formation of the glaze-forming compound $Si_2AlO(PO_4)_3$. It is expedient, as medium and coarse grain portions (for example, using medium particle sizes of from about 0.09 to 2 mm, and coarse particle sizes ranging from about 2 to 4 mm), to select compositions of a $SiO_2$—$Al_2O_3$ system which already contain a significant amount of glass phase, in addition to, for example, crystalline cristobalite and tridymite. In accordance with the teachings of the accompanying melting diagram, these are $SiO_2$—$Al_2O_3$ compositions which are located near the eutectic of this system, and which are designated, in the nomenclature of the refractory industry, as siliceous fire clay of class B of the German DIN-classification. Such clays are characterized by contents of from about 10 to 30 weight percent (100 total weight percent basis) of $Al_2O_3$. Exceeding this $Al_2O_3$ content decreases the desired alkali resistance of the coarse and medium grain portion of the bricks, whereas falling below this $Al_2O_3$ content leads, in chemical reaction with alkalies, to such dilute reaction products that the brick is relatively rapidly worn away in kiln use.

The accompanying FIGURE shows the compatibility triangle for the oxides $SiO_2$, $Al_2O_3$ and $P_2O_5$ with the glaze-forming phase $Si_2AlO(PO_4)_3$, according to the invention. As follows from the subtriangle, $SiO_2$—$Si_2AlO(PO_4)_3$—mullite, these three compounds are stable next to one another. The shaded region shows the region of compounds of the oxides $SiO_2$, $Al_2O_3$ and $P_2O_5$ in the fines portion with a grain size of less than about 0.09 mm at the usual and preferred grain fraction for brick production, such region of compounds being preferably utilized according to the present invention for use in manufacturing the fireproof, thermally insulating bricks of this invention.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE 1

Merck $SiO_2$-Gel (X-ray-amorphous), $Al_2O_3$ (active, neutral) and orthophosphoric acid (75 percent) were mixed in a molar ratio 4:1:3, with reference to the pure oxides $SiO_2$, $Al_2O_3$ and $P_2O_5$, and heated for several hours at temperatures between 700° and 1100° C. and were subsequently X-rayed. Above 700° C., the compound $Si_2AlO(PO_4)_3$ was able to be detected, the X-ray data of which are compiled in the following Table 1:

TABLE 1

| \multicolumn{4}{c}{X-ray data of the compound $Si_2AlO(PO_4)_3$:} |
|---|---|---|---|
| d | r | d | r |
| 7.52 | 4 | 2.98 | 5 |
| 6.89 | 12 | 2.90 | 1 |
| 4.81 | 20 | 2.84 | 2 |
| 4.42 | 14 | 2.76 | 4 |

TABLE 1-continued

| \multicolumn{4}{c}{X-ray data of the compound $Si_2AlO(PO_4)_3$:} |
|---|---|---|---|
| d | r | d | r |
| 3.99 | 10 | 2.72 | 5 |
| 3.81 | 4 | 2.61 | 4 |
| 3.72 | 6 | 2.51 | 10 |
| 3.64 | 100 | 2.42 | 3 |
| 3.53 | 2 | 2.37 | 3 |
| 3.46 | 6 | 2.30 | 5 |
| 3.13 | 1 | 2.23 | 5 |

The melting interval of the compound $Si_2AlO(PO_4)_3$ was determined as 1000° to 1300° C. in a heating microscope.

EXAMPLE 2

30 percent by weight of fire clay of 2 to 4 mm, 10 percent by weight of fire clay 2 to 1 mm in particle size, 25 percent by weight of fire clay 1 to 0.09 mm in particle size, 25 percent by weight of fire clay less than 0.09 mm in particle size and 10 percent by weight of bonding clay less than 0.09 mm in particle size (all on a 100 weight percent total weight basis) were mixed together, and then mixed with 12 percent by weight of $H_3PO_4$ (75 percent). The mixture was compressed and heated for several hours at between 300° and 1100° C. The compound $Si_2AlO(PO_4)_3$ was able to be detected above 700° C. Between 1000° and 1300° C. a brick prepared from such compound showed a glazing as a result of melting of the compound $Si_2AlO(PO_4)_3$ on a heated face thereof.

The composition of the raw materials used is shown by the following Table 2:

TABLE 2

| Oxide | Fire Clay | Bonding Clay | $H_3PO_4$ 75% |
|---|---|---|---|
| $SiO_2$ | 76.87% | 54.90% | — |
| $Al_2O_3$ | 17.60% | 37.19% | — |
| $Fe_2O_3$ | 0.76% | 2.74% | — |
| $TiO_2$ | 1.55% | 1.64% | — |
| CaO | 0.76% | 0.91% | — |
| MgO | 0.79% | 0.64% | — |
| $Na_2O + K_2O$ | 1.67% | 1.59% | — |
| $P_2O_5$ | — | — | 54.32% |

EXAMPLE 3

Test brick bodies were molded and pressed out of the composition corresponding to Example 2 and were fired at 1100° C. For a comparison, a test body of the same composition, but without $H_3PO_4$, was similarly molded and pressed and fired at 1100° C. Each such test body was subsequently bored out to form a crucible therein and then each was filled with the same quantity of KCl and fired for five hours at 1100° C. in a laboratory kiln. After cooling, a heavy glazing of the crucible inner wall was observed in the case of the composition according to Example 2, without substantial quantities of KCl having diffused into the brick material. In the $P_2O_5$-free test body of the same basic composition, on the other hand, a bursting and an infiltration of the brick with KCl was observed. The features of this invention disclosed in the preceding specification, in the accompanying drawing, as well as in the appended claims can be essential not only individually but also in optional combinations, for the realization of the invention in its various embodiment forms.

Bricks prepared in accordance with the teachings of this invention can have any convenient dimensions.

Typically, bricks used in, for example, rotary cement kilns have dimensions ranging from about 160 to 300 mm in height, 150 to 250 mm in length, 80 to 155 mm in width, measured at the surface of the brick exposed to the kiln shell, and a conicity adapted to the diameter of the respective kiln. Preferably, brick produced in accordance with the teachings of this invention has a density ranging approximately from 1.0 to 2.0 grams per cubic centimeter. Such brick, in use, at temperatures above about 700° C., develops a glass facing on the heat exposed face thereof as hereinabove explained.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the hereto-appended claims.

We claim:

1. A phosphate glass in the $Al_2O_3$—$SiO_2$—$P_2O_5$ system characterized by having the following composition on a 100 weight percent total glass weight basis:

14.00 weight percent $Al_2O_3$
   32.93 weight percent $SiO_2$
   53.02 weight percent $P_2O_5$, by having a formula in its melted glass phase of $Si_2Al0(PO_4)_3$ or of $4SiO_2.Al_2O_3.3P_2O_5$ and by being compatible with $SiO_2$-phases selected from the group consisting of cristobalite, tridymite, and mullite.

2. A composition for producing a phosphate glass characterized in that the individual components lie within a region defined by a triangle A-B-C with the following boundary compositions:

A = 10.5 wt. % $Al_2O_3$, 84.5 wt. % $SiO_2$, 5 wt. % $P_2O_5$;
   B = 28.6 wt. % $Al_2O_3$, 66.4 wt. % $SiO_2$, 5 wt. % $P_2O_5$; and
   C = 14.00 wt. % $Al_2O_3$, 32.93 wt. % $SiO_2$, 53.02 wt. % $P_2O_5$.

3. A composition of claim 2, characterized in that as oxidic starting material for $SiO_2$ is provided at least one member selected from the group consisting of kieselguhr, rice hull ash, tridymite, and cristobalite, and for $P_2O_5$ is provided at least one member selected from the group consisting of $H_3PO_4$, acidic or neutral aluminum phosphate, and ammonium phosphate.

4. A method for producing a phosphate glass comprising heating a composition of claim 2 to a temperature of from about 700° C. to 1100° C. for a time at least sufficient to fuse such composition of claim 2 into a glass melt.

* * * * *